US012619008B2

(12) United States Patent
Tenhaeff et al.

(10) Patent No.: US 12,619,008 B2
(45) Date of Patent: May 5, 2026

(54) OPTICAL HALOGENATED POLYMER THIN FILM WITH ULTRA-HIGH REFRACTIVE INDEX

(71) Applicant: University of Rochester, Rochester, NY (US)

(72) Inventors: Wyatt Tenhaeff, Rochester, NY (US); Ni Huo, Rochester, NY (US)

(73) Assignee: University of Rochester, Rochester, NY (US)

( * ) Notice: Subject to any disclaimer, the term of this patent is extended or adjusted under 35 U.S.C. 154(b) by 837 days.

(21) Appl. No.: 17/856,577

(22) Filed: Jul. 1, 2022

(65) Prior Publication Data

US 2023/0029395 A1 Jan. 26, 2023

Related U.S. Application Data

(60) Provisional application No. 63/219,200, filed on Jul. 7, 2021.

(51) Int. Cl.
*G02B 1/111* (2015.01)

(52) U.S. Cl.
CPC .................................... *G02B 1/111* (2013.01)

(58) Field of Classification Search
CPC ...................................................... G02B 1/111
See application file for complete search history.

(56) References Cited

U.S. PATENT DOCUMENTS

2007/0146882 A1* 6/2007 Yoshioka ............. G02B 5/3016 359/487.02
2013/0178575 A1* 7/2013 Yoshida ................ C08F 210/18 524/554
2019/0267574 A1* 8/2019 Gunbas ................ G02B 5/0278

FOREIGN PATENT DOCUMENTS

JP 2014063125 A * 4/2014 ........... C09D 183/04

OTHER PUBLICATIONS

Moulay, Saad, Molecular iodine/polymer complexes, J Polym Eng 2013; 33(5): 389-443.*
Higashihara T. and Ueda M., Recent Progress in High Refractive Index Polymers, Macromolecules 2015, 48, pp. 1915-1929 (DOI:10.1021/ma502569r).
Qi Y, Ding J, Day M, Jiang J, and Callender C, Cross-linkable highly halogenated poly(arylene ether ketone/sulfone)s with tunable refractive index: Synthesis, characterization and optical properties, Polymer 47(2006), pp. 8263-8271 (doi:10.1016/j.polymer.2006.09.065).
Mouly, Molecular iodine/polymer complexes, DOI 10.1515/polyeng-2012-0122 J Polym Eng 2013, 33(5), pp. 389-443.

* cited by examiner

*Primary Examiner* — Anthony J Frost
(74) *Attorney, Agent, or Firm* — Wissing Miller LLP

(57) ABSTRACT

A high refractive index coating made by forming a solid thin layer of a polymer such as P4VP by a process such as iCVD and halogenating the solid layer to thereby form a film that has a greatly increased refractive index and other desirable optical and physical properties.

20 Claims, 5 Drawing Sheets

OPTICAL HALOGENATED POLYMER THIN FILM WITH ULTRA-HIGH REFRACTIVE INDEX

REFERENCE TO RELATED APPLICATION

This application claims the benefit of and incorporates by reference U.S. Provisional Patent Application No. 63/219,200 filed on Jul. 7, 2021.

FIELD

This patent specification relates to high refractive index films and more specifically to films of this type that have desirable combinations of optical and physical properties.

BACKGROUND

High refractive index polymers (HRIP) are an important class of materials with actual or potential applications in optoelectronic devices, such as anti-reflective components for displays, encapsulants for light emitting diodes, and optical sensors. Some of the desirable properties of such films are high refractive index, good manufacturability and low cost, high transmission at least at selected wavelengths, and resistance to physical damage. As discussed in Higashihara T. and Ueda M., *Recent Progress in High Refractive Index Polymers*, Macromolecules 2015, 48, 1915-1929 (DOI:10.1021/ma502569r), which is hereby incorporated by reference in this patent specification, "a very high-n exceeding 1.7 and even 1.8 is frequently desired." The article discusses the use of multi-layer films, for example as seen in FIG. 6 thereof, and on page 1922 refers to a three-layer polymer coating in which a layer has a titania content of 50 wt % and refractive index n=1.86. Another publication discusses halogenated polymers with a refractive index that can be adjusted within a range from 1.51 to 1.57. See Qi Y, Ding J, Day M, Jiang J, and Callender C, *Cross-linkable highly halogenated poly*(*arylene ether ketone/sulfone*)*s with tunable refractive index: Synthesis, characterization and optical properties*, Polymer 47(2006) 8263-8271 (doi: 10.1016/j.polymer.2006.09.065), hereby incorporated by reference in this patent specification. It would be desirable to develop polymer coatings with better optical and physical properties that are more easily manufacturable and are less expensive.

The subject matter described or claimed in this patent specification is not limited to embodiments that solve any specific disadvantages or that operate only in environments such as those described above. Rather, the above background is only provided to illustrate one exemplary technology area where some embodiments described herein may be practiced.

SUMMARY

The summary below reflects the initially claimed subject matter, which can evolve in prosecution of this patent application.

According to some embodiments, a coating comprises: a film formed of a layer comprising poly(4-vinylpyridine) (P4VP) in which one or more of Chlorine (CI), Bromine (Br) and Iodine (I) halogens have been introduced after the layer has been formed to thereby form the film as a charge transfer complex of the previously formed layer and said one or more of Cl, Br and I; wherein: (a) the film exhibits a refractive index of 1.707 or more at 632.8 nm; and (b) the film thickness is in the 10-2000 nm range.

According to some embodiments, the coating can include one or more of the following features: (a) the extinction coefficient of the film is no more than $7\times10^{-4}$, or $2.4\times10^{-3}$, at wavelengths in the 650-800 nm range; (b) the refractive index of the film is more than 1.8, or 2.0, for wavelengths in the 400-800 nm range; (c) the polymer comprises p(4VP-co-EGDMA), a copolymer of 4-vinylpyridine (4VP) and ethylene glycol dimethacrylate (EGDMA); (d) the polymer comprises a copolymer of 4VP and EGDMA in proportions configured for a selected tuning of the refractive index of the film; (e) the coating comprises poly(4-vinylpyridine) (P4VP) in a charge transfer complex with I—Cl, or I—Br, or I2; (f) the film thickness is in the range of 10-500 nm; and (g) the film thickness is approximately 200 nm.

According to some embodiments, a process of making a film having a selected refractive index comprises: forming a layer comprising a first polymer; introducing one or more of Cl, Br, and I into the layer after the layer has been formed to thereby form a film of a charge transfer complex of one or more of Cl, Br, and 12 with the layer and has: (a) refractive index of 1.7 or more for wavelengths in the 400-800 nm range; and (b) film thickness in the 10-1000 nm range.

According to some embodiments, the process can further include one or more of the following features; (a) the step of forming the layer further includes forming the layer of a copolymer of 4VP and EGDMA, p(4VP-co-EGDMA), to thereby tune the refractive index of the film; (b) the step of forming the film comprises forming a film that has a refractive index of more than 1.8 for wavelengths in the 400-800 nm range; and (c) the step of forming the film comprises forming a film that has a refractive index of more than 2.0 for wavelengths in the 400-800 nm range.

According to some embodiments, a coating comprises: a film comprising a polymer layer in which one or more of the halogens Cl, Br and I have been introduced after the layer has been formed to thereby form a charge transfer complex of the layer and one or more of Cl, Br and I; wherein: (a) the film exhibits a refractive index of 1.7 or more for wavelengths in the 400-800 nm range; and (b) the film thickness is in the 10-2000 nm range.

According to some embodiments, the polymer layer into which said one or more halogens have been introduced can comprise a base polymer that can serve as Lewis base when reacting with halogen compounds. To improve the tunability of refractive indices, another polymer can be selected to form copolymer with the base polymer (which serves as a Lewis base) provided it can form copolymer with the base polymer and does not react with the one or more halogen compounds that have been introduced in the base polymer.

According to some embodiments, the coating described in the immediately preceding two paragraphs can include one or both of the following features: (a) the base polymer layer comprises P4VP; (b) the film comprises a copolymer of 4VP and EGDMA, p(4VP-co-EGDMA); and (c) the film exhibits a refractive index of 1.8 or more.

BRIEF DESCRIPTION OF THE DRAWINGS

To further clarify the above and other advantages and features of the subject matter of this patent specification, specific examples of embodiments thereof are illustrated in the appended drawings. It should be appreciated that these drawings depict only illustrative embodiments and are therefore not to be considered limiting of the scope of this patent specification or the appended claims. The subject matter hereof will be described and explained with additional specificity and detail using the accompanying drawings in which:

DETAILED DESCRIPTION

Figure 1:
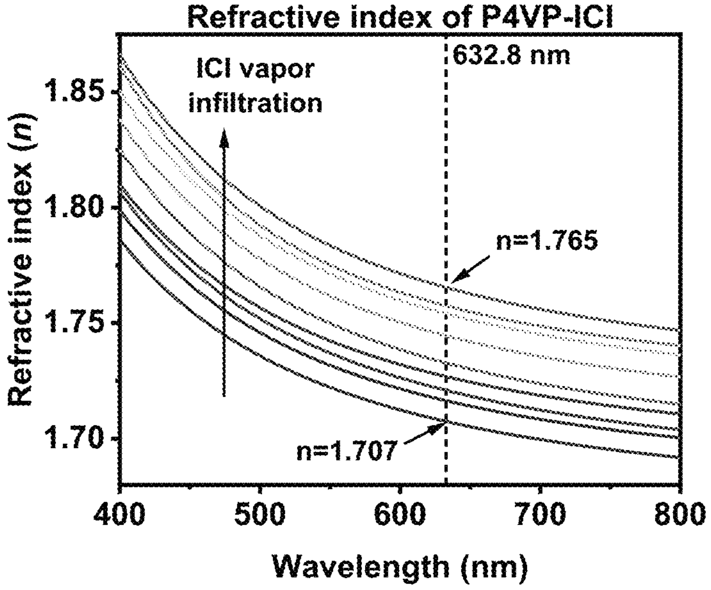
FIG. 1 shows graphs of refractive index vs. wavelength for an example of a P4VP-ICI film, according to some embodiments.

A detailed description of examples of preferred embodiments is provided below. While several embodiments are described, the new subject matter described in this patent specification is not limited to any one embodiment or combination of embodiments described herein, but instead encompasses numerous alternatives, modifications, and equivalents. In addition, while numerous specific details are set forth in the following description to provide a thorough understanding, some embodiments can be practiced without some or all these details. Moreover, for the purpose of clarity, certain technical material that is known in the related art has not been described in detail to avoid unnecessarily obscuring the new subject matter described herein. It should be clear that individual features of one or several of the specific embodiments described herein can be used in combination with features of other described embodiments or with other features. Further, like reference numbers and designations in the various drawings indicate like elements.

Because typical commodity polymers are believed to possess refractive indexes (RI) in the range 1.3-1.7, obtaining polymers with RI greater than 1.8 while maintaining high optical transparency is an important challenge. Halogen atoms such as chlorine, bromine, and iodine have high atomic refractivity ranging from 5.97 to 13.90 $cm^3$ $mol^{-1}$ and can be useful components in the development of HRIPs (high refractive index polymers). As described in this patent specification, a series of halogenated polymer thin films with high refractive indexes (for example, n=1.7-2.0 or higher) and outstanding optical transparency in the visible range, were prepared via a unique vapor phase process—initiated chemical vapor deposition (iCVD). iCVD is a technique that can fabricate a wide range of polymer coatings for many applications. In examples described in this patent specification, poly(4-vinylpyridine) (P4VP) films with thickness ranging from 100 nm to 600 nm were prepared using iCVD, then treated by halogen vapor/solution to form halogen containing polymer thin films with high RI. The charge-transfer complex (CTC) formed between P4VP and halogen compounds, prepared by a vapor/solution infiltration of halogen compounds, increases the RI of the P4VP thin film from 1.58 to 2.0 or higher while maintaining the conformal and smooth nature of the as-deposited thin films. In one example, the P4VP-I2 complex is demonstrated to have an RI of 2.0 and is transparent above a wavelength of 600 nm. In another formulation, P4VP complexed with ICI achieved an RI up to 1.77, while still retaining the outstanding optical transparency throughout visible range. The RI of the halogenated polymer films can be further fine-tuned by controlling the concentration of CTC in the polymer film via copolymerization with other monomers that are inert to halogen compounds. A series of P4VP thin films copolymerized with 1H,1H,6H,6H-perfluoro-1,6-hexyl diacrylate (PFHDA) with RI ranging from 1.50 to 1.98 were prepared according to the teachings of this patent specification. The formation of charge-transfer complex (CTC) in halogenated polymer thin film was confirmed via both Fourier-transform infrared and UV-Vis spectroscopies. The optical performance of these coatings was characterized by spectroscopic ellipsometry and specular reflectometry. The thermal and environmental stability of these films were also investigated as a function of temperature. The refractive index (RI) of P4VP-I2 film decreased by 7.9% after 24 hours at 20° C. In comparison, the RI of P4VP-ICI film decreased by 0.41% over 24 hours at 20° C. These halogenated polymer thin films are expected to have wide applications in sensors and optoelectronic devices as well as other fields.

FIG. 1 illustrates optical properties of an example of a halogenated polymer film P4VP-ICI prepared as described above using iCVD to form a thin layer of P4VP and then infiltrating iodine monochloride therein to form a P4VP-ICI film that is 200 nm thick in this example, but film thickness can range from 10 to 2000 nm in other examples. The film is on a Si wafer substrate. The refractive coefficient was measured for the indicated range of wavelengths using spectroscopic ellipsometry, using a J. A. Woollam RC2 unit. As seen, the refractive index increases with greater infiltration of I—Cl, from n=1.707 to n=1.765 at wavelength=632.8 nm. The refractive index is highest at 400 nm and gradually decreases with increasing wavelength to 800 nm.

Figure 2:
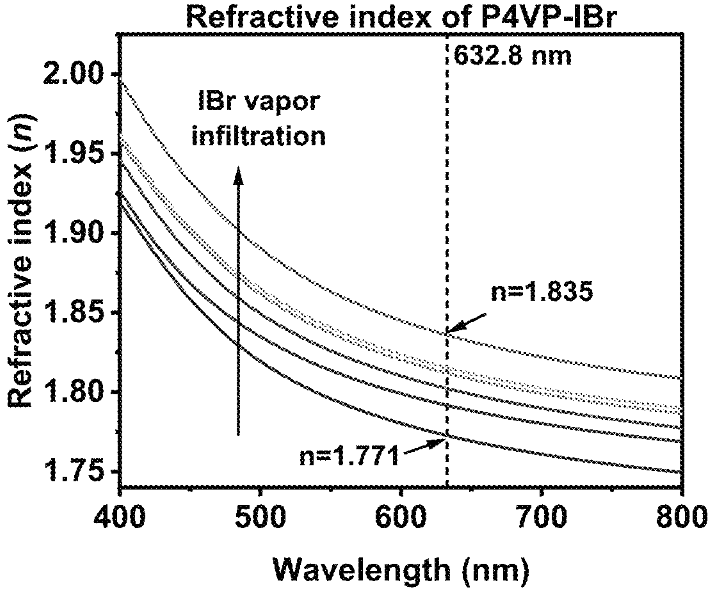
FIG. 2 shows graphs of refractive index vs. wavelength for an example of a P4VP-IBr film, according to some embodiments.

FIG. 2 illustrates like information in like ways for a film infiltrated with iodine monobromide rather than iodine monochloride. In this case, the refractive coefficient is higher, n=1.835 at wavelength 632.8 nm and the maximum extinction coefficient is considered acceptably stable after about 500 nm ($k_{MAX}$=2.40×$10^{-3}$).

Figure 3:
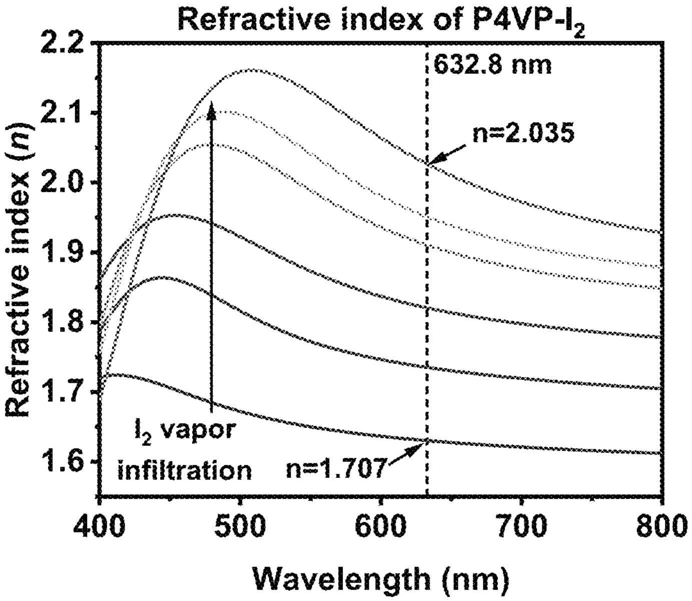
FIG. 3 shows graphs of refractive index vs. wavelength for an example of a P4VP-I2 film, according to some embodiments.

FIG. 3 illustrates like information in like ways for a film infiltrated with molecular iodine ($I_2$) rather than ICI or IBr. In this case, the refractive coefficient is even higher, n=2.035 at wavelength 632.8 nm.

Figure 4:
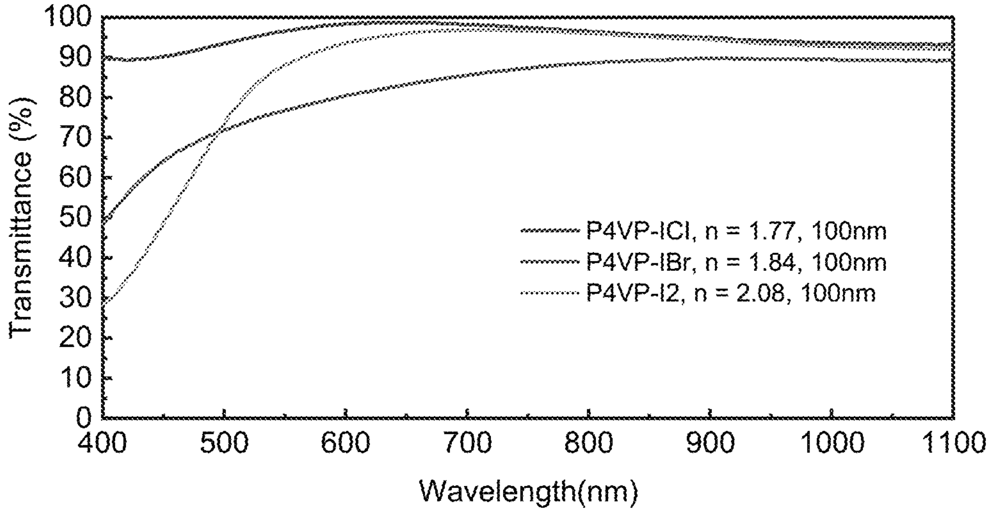
FIG. 4 shows transmittance % vs. wavelength for three polymers in a 100 mm layers, according to some embodiments.

FIG. 4 illustrates transmittance % vs. wavelength for three polymers in a 100 mm thick layers and shows their refractive indices. Transmittance % is steady after 600 nm for all three polymers and is steady for P4VP-ICI for nearly the entire 400-1100 nm range. For P4VP-IBr the transmittance % rises more sharply in the 400-600 nm range, and for P412 the rise is steeper in the 400-600 nm range.

Figure 5:
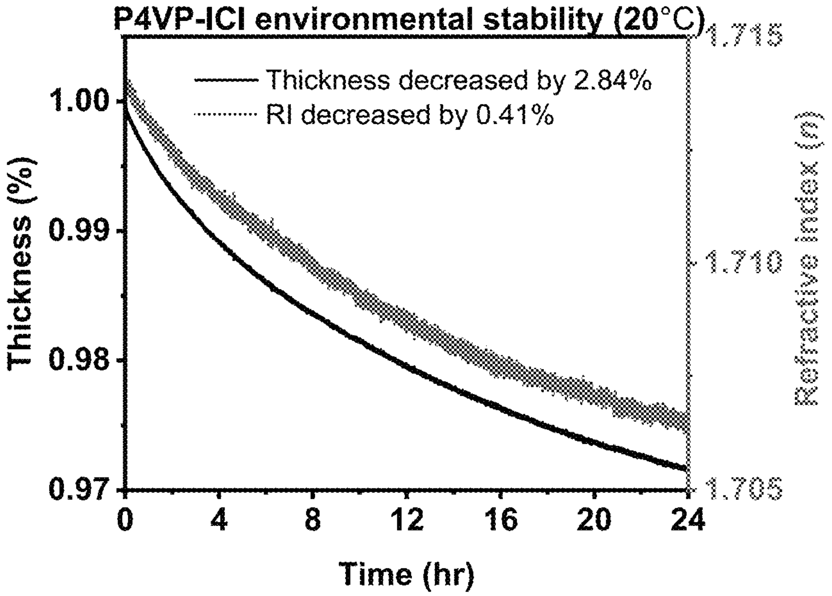
FIG. 5 illustrates environmental stability results of P4VPICI at 20 degrees C. as a graph of thickness % change and refractive index vs. time, according to some embodiments.

FIG. 5 illustrates environmental stability results of P4VPICI at 20 degrees C. as a graph of thickness % change and refractive index vs. time. As the graphs show, over a 24-hour period thickness decreased by 2.84% and refractive index decreased by 0.41% but still remained higher than 1.75.

Figure 6:
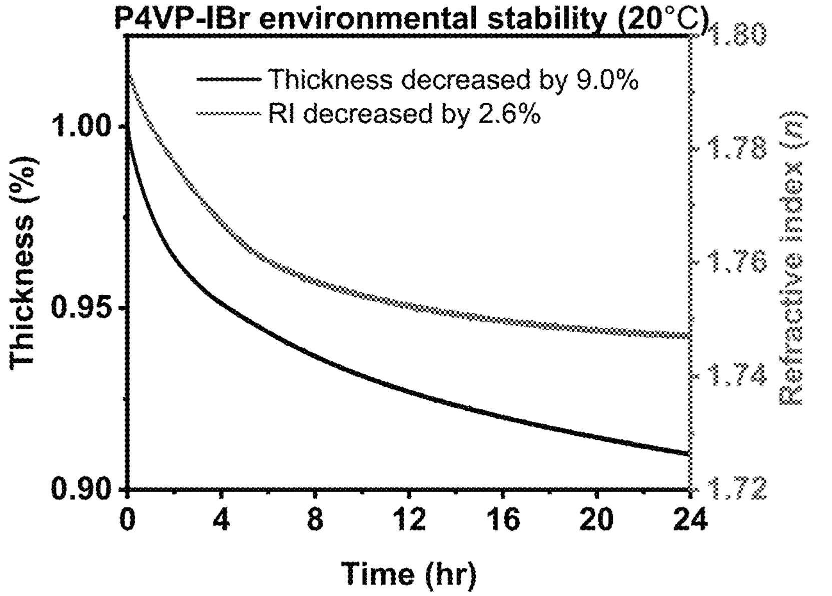
FIG. 6 illustrates environmental stability results for a film of P4VP-IBr at 20 degrees C. as a graph of thickness % change and refractive index vs. time, according to some embodiments.

FIG. 6 illustrates environmental stability results of P4VP-$I_2$ at 20 degrees C. as a graph of thickness % change and refractive index vs. time. As the graphs show, over a 24-hour period thickness decreased by 9.0% and refractive index decreased by 2.6% but remained nearly 1.75.

Figure 7:
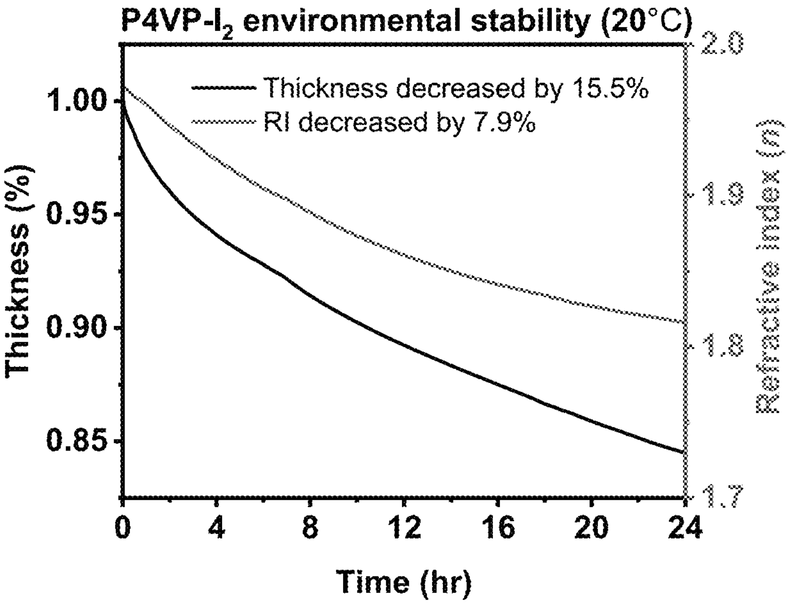
FIG. 7 illustrates environmental stability results for a film of P4VP-$I_2$ at 20 degrees C. as a graph of thickness % change and refractive index vs. time, according to some embodiments.

FIG. 7 illustrates environmental stability results of P4VPIBr at 20 degrees C. as a graph of thickness % change and refractive index vs. time. As the graphs show, over a 24-hour period thickness decreased by 15.5% and refractive index decreases by 7.9% but remained higher than 1.8.

Figure 8:
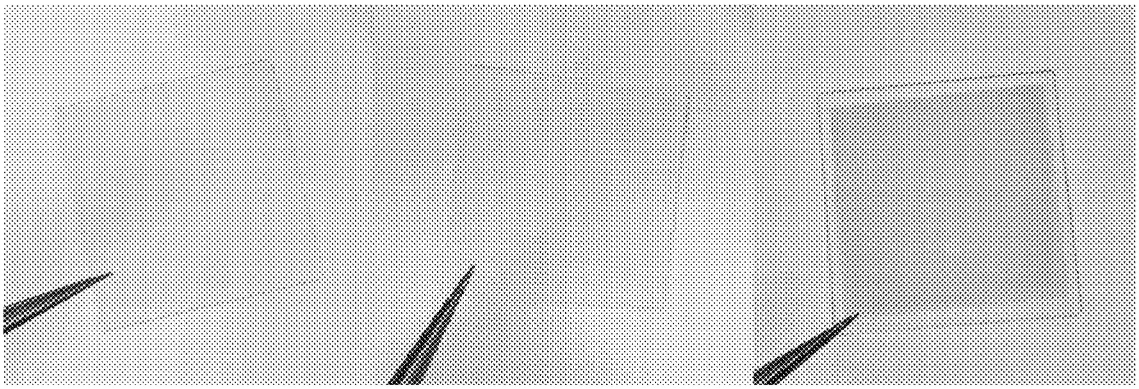
FIG. 8 illustrates optical transparency and tint of films of P4VP-ICI, P4VP-IBr, and P4VP-I2, according to some embodiments.

FIG. 8 illustrates color and morphology of the halogenated polymer films of FIGS. 1, 2, and 3 and shows images of 200 nm thick films on quartz slides. The left panel shows a P4VP-ICI film, the middle panel shows a P4VP-IBr film, and the right panel shows a P4VP-$I_2$ film. P4VP-ICI is optically transparent, P4VP-IBr has a slight yellow tint, and P4VP-$I_2$ film has a bright yellow to brown tint.

Figure 9:
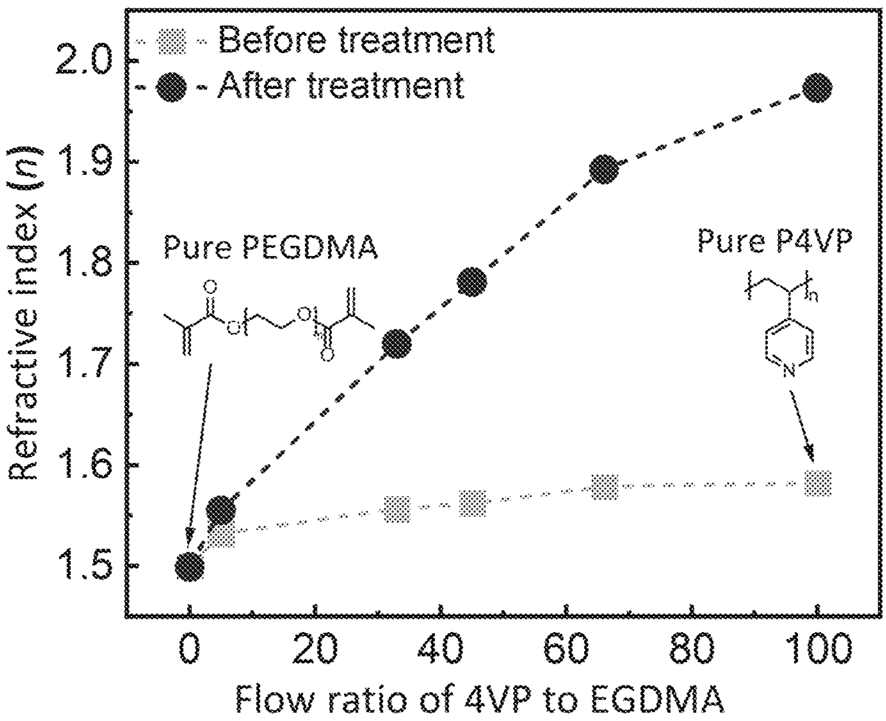
FIG. 9 illustrates a graph of refractive index vs. flow ratio of 4VP to EGDMA before and after treatment, according to some embodiments.

FIG. 9 shows a graph of refractive index vs. flow ratio of 4VP to EGDMA. As illustrated, the refractive index rises steeply with increase of the flow ratio for PEGDMA and less steeply for P4VP.

Figure 10A:
FIG. 10*a* shows a first example of a system and process for introducing halogens into a layer of polymer to form the films.

FIG. 10*a* shows an example of a system and process of halogenating a P4VP layer coated on a substrate such as Silicon. The substrate is placed on the bottom of a sealable container of Iodine hexane solution, with a P4VP layer formed thereon facing up so that a charge transfer complex (CTC) is formed between the P4VP and the halogen compounds. The resulting formation of P4VP-$I_2$ boosts the refractive index of the polymer thin film from 1.58 to 2.0 and higher, depending on factors including treatment time.

Figure 10B:
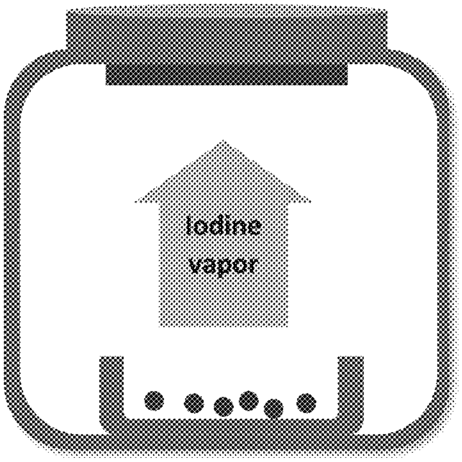
FIG. 10*b* shows another example, according to some embodiments.

FIG. 10*b* shows an alternative system and process, in which a P4VP coated on a Si substrate faces down near the top of a sealable container that has a boat of molecular Iodine at the bottom configured to sublimate and form IBr or ICI vapor that halogenates the P4VP layer to form a P4VP-IBr or P4VP-ICI film. FIGS. 10*a* and 10*b* are schematic illustrations for explaining principles of a system and process for halogenating P4VP layers. Similar systems and methods can be used for halogenating the polymer layer with Cl and Br. In an industrial system and process, preferably a continuous process would pass a layer of P4VP through a bath a halogen or halogen compound such as Iodine hexane solution, of through a vapor of a halogen such as molecular Iodine, or the process can be a mechanized batch process.

In some embodiments, two or more halogens can be introduced in this manner in a layer of a polymer to form a high refractive index film.

In iodine charge transfer complexes, the Iodine acts as a Lewis acid. Thus, many other monomers who can act as a soft Lewis base also could form charge transfer complex with Iodine and other halogenating agents. Specifically, monomers containing pyridine, imidazole/triazole, aniline and (possibly) pyrrole could be the polymer hosts, including the following examples:

Amine-Containing Monomers:

2-vinyl pyridine 4-vinyl pyridine

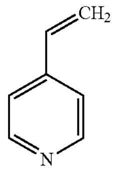

V3204
4-Vinylpyridine

Sigma-Aldrich 2-vinylpyrazine 716022
2-Vinylpyrazine

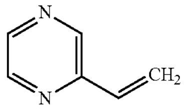

Sigma-Aldrich 1-vinyl-2-pyrrolidinone

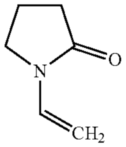

1-vinyl imidazole

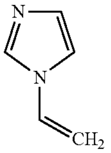

4-methyl-5-vinylthiazole

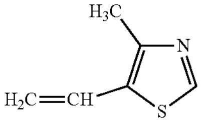

1-vinyl-1,2,4-triazole 95077
1-Vinyl-1,2,4-triazole

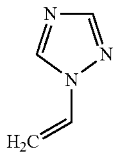

Sigma-Aldrich 2-methyl-1-vinyl imidazole

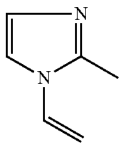

S463205
2-METHYL-1-VINYLIMIDAZOLE
Sigma-Aldrich

1-Vinyl-1H-benzimidazole (RI = 1.594)

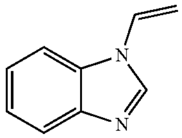

4-Vinylaniline

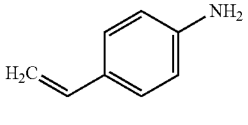

-continued 3-vinyl aniline

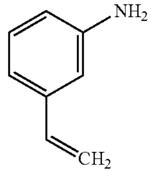

560839
3-Vinylaniline

Sigma-Aldrich 2-isopropenylaniline

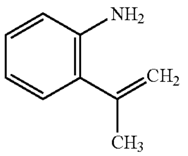

194212
2-
Isopropenylaniline

Sigma-Aldrich

Aziridine

N-Methyl-N-vinylacetamide (not sure)

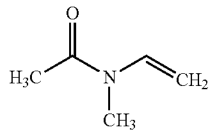

N-vinylcaprolactam

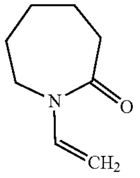

95077
N-Vinylcaprolactam

Sigma-Aldrich

2-Vinyl-1H-pyrrole

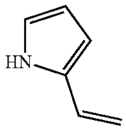

The halogenating agents can include one or more of the following examples: Iodine, Iodine monobromide, Iodine monochloride, Bromine monochloride, Iodomethane, Diiodomethane, and Triiodomethane.

Many comonomers can be copolymerized with 4-VP or any of the amine-bearing comonomers listed above. The principle is to use a comonomer that does not contain basic functionality, so that it would not complex the halogens, providing ability for concentration of halogens in the film. Examples are: Ethylene glycol diacrylate (EGDA); Di(ethylene glycol) diacrylate (DEGDA); 1, 6-hexanediol diacrylate (HDDA); 1, 4-butanediol diacrylate (BDDA); 1H,1H, 2H,2H-Perfluorodecyl acrylate (PFDA); (1H,1H,6H,6H-perfluorohexyl diacrylate) (PFHDA); Ethylene glycol dimethacrylate (EGDMA); Glycidyl methacrylate (GMA); Cyclohexyl methacrylate (CMA); Methyl methacrylate; Butyl methacrylate; 1,4-Butanediol divinyl ether (BDDVE) Di(ethylene glycol) divinyl ether (DEGDVE); 1,11-dodecadiene (DDDE); 1,9-decadiene (DDE); Hexavinyldisiloxane (HVDS); 1,3,5-trivinyl-1,3,5-trimethylcyclotrisiloxane (V3D3); and 1,3,5,7-tetravinyl-1,3,5,7-tetramethylcyclotetrasiloxane (V4D4).

In principle, it is believed possible to use many other polymers, copolymers, and halogen/interhalogen species (Cl2, Br2, ClBr, etc.). This number of combinations is large.

The list above of amine-bearing monomers is incomplete, and amines are not the only functional groups capable of forming CTCs with halogens/interhalogens. A general requirement for CTC is an interaction between an electrophile (halogens and interhalogens) and nucleophiles (incorporated into the polymer). This can also be viewed as a Lewis acid-Lewis base interactions, but the description using Lewis acidity/basicity should not be limiting as other polymers that do not contain obvious Lewis basic group can form CTCs with iodine and other halogens. Example is starch or conjugated polymers. See, for example, a review article that describes CTC with iodine: De Gruiter, Molecular iodine/polymer complexes, doi 10.1515/polyeng-2012-0122—J Polym Eng 2013; 33; 389-443, which is hereby incorporated by reference.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the body of work described herein is not to be limited to the details given herein, which may be modified within the scope and equivalents of the appended claims.

What is claimed is:

1. A coating comprising:

a polymer or copolymer layer in which one or more of Chlorine (Cl), Bromine (Br) and Iodine (I) halogens have been introduced after the layer has been formed to thereby form a film as a charge transfer complex of the previously formed layer and said one or more of Cl, Br and I;

wherein:

the film exhibits a refractive index of 1.7 or more for wavelengths in the 400-800 nm range; and the film thickness is in the 10-2000 nm range.

2. The coating of claim 1, in which an extinction coefficient of the film is no more than $7\times10^{-4}$ at wavelengths in the 650-800 nm range.

3. The coating of claim 1, in which an extinction coefficient of the film is no more than $2.4\times10^{-3}$ at wavelengths in the 650-800 nm range.

4. The coating of claim 1, in which the refractive index of the film is more than 1.8 for wavelengths in the 400-800 nm range.

5. The coating of claim 1, in which the refractive index of the film is more than 2.0 for wavelengths in the 400-800 nm range.

6. The coating of claim 1, in which the copolymer comprises p(4VP-co-EGDMA).

7. The coating of claim 1, in which the copolymer comprises 4VP and EGDMA in proportions configured for a selected tuning of the refractive index of the film prior to halogen incorporation.

8. The coating of claim 1, in which the polymer or copolymer is in a charge transfer complex with I—Cl.

9. The coating of claim 1, in which the polymer or copolymer is in a charge transfer complex with I—Br.

10. The coating of claim 1, in which the polymer or copolymer is in a charge transfer complex with $I_2$.

11. The coating of claim 1, in which the film thickness is in the range of 10-500 nm.

12. A coating comprising:

a film comprising a polymer or copolymer layer in which one or more of Cl, Br and I have been introduced after the layer has been formed to thereby form a charge transfer complex of the layer and one or more of Cl, Br and I;

wherein:

the film exhibits a refractive index of 1.7 or more for wavelengths in the 400-800 nm range; and the film thickness is in the 10-2000 nm range.

13. The coating of claim 12, in which the polymer layer comprises P4VP.

14. The coating of claim 13, in which the copolymer comprises P4VP and PEGDMA, p(4VP-co-EGDMA).

15. The coating of claim 12, in which the film exhibits a refractive index of 1.8 or more.

16. The coating of claim 12, in which the polymer comprises one or more of poly(2-vinyl pyridine), poly(4-vinyl pyridine), poly(2-vinyl pyrazine), poly(vinyl pyrrolidinone), poly(vinyl imidazole), poly(4-methyl-5-vinylthiazole), poly(vinyl 1,2,4-triazole), poly(2-methyl-1-vinyl imidazole), poly(1-vinyl-1H-benzimidazole), poly(4-vinylaniline), poly(3-vinylaniline), poly(2-isopropenylaniline), poly(ethylene imine), poly(N-vinylcaprolactam), and poly(2-vinyl-1H-pyrrole).

17. The coating of claim 12, in which the polymer or copolymer comprises at least one the following monomers: 2-vinyl pyridine, 4-vinyl pyridine, 2-vinyl pyrazine, 1-vinyl-2-pyrrolidinone, 1-vinyl imidazole, 4-methyl-5-vinylthiazole, 1-vinyl-1,2,4-triazole, 2-methyl-1-vinyl imidazole, 1-vinyl-1H-benzimidazole, 4-vinylaniline, 3-vinylaniline, 2-isopropenylaniline, N-vinylcaprolactam and 2-vinyl-1H-pyrrole.

18. The coating of claim 12, in which the polymer contains moieties that act as Lewis bases that can form molecular complexes with halogen species.

19. The coating of claim 1, in which the polymer comprises one or more of poly(2-vinyl pyridine), poly(4-vinyl pyridine), poly(2-vinyl pyrazine), poly(vinyl pyrrolidinone), poly(vinyl imidazole), poly(4-methyl-5-vinylthiazole), poly(vinyl 1,2,4-triazole), poly(2-methyl-1-vinyl imidazole), poly(1-vinyl-1H-benzimidazole), poly(4-vinylaniline), poly(3-vinylaniline), poly(2-isopropenylaniline), poly(ethylene imine), poly(N-vinylcaprolactam), and poly(2-vinyl-1H-pyrrole).

20. The coating of claim 1, in which the polymer or copolymer comprises at least one the following monomers: 2-vinyl pyridine, 4-vinyl pyridine, 2-vinyl pyrazine, 1-vinyl-2-pyrrolidinone, 1-vinyl imidazole, 4-methyl-5-vinylthiazole, 1-vinyl-1,2,4-triazole, 2-methyl-1-vinyl imidazole, 1-vinyl-1H-benzimidazole, 4-vinylaniline, 3-vinylaniline, 2-isopropenylaniline, N-vinylcaprolactam and 2-vinyl-1H-pyrrole.

* * * * *